United States Patent
Cariveau (10) Patent No.: US 11,806,902 B2
(45) Date of Patent: Nov. 7, 2023

(54) ELASTOMERIC STATOR WITH MODIFIED FIBER ORIENTATION

(71) Applicant: Abaco Drilling Technologies LLC, Houston, TX (US)

(72) Inventor: Peter T. Cariveau, Houston, TX (US)

(73) Assignee: Abaco Drilling Technologies LLC, Houston, TX (US)

( * ) Notice: Subject to any disclaimer, the term of this patent is extended or adjusted under 35 U.S.C. 154(b) by 526 days.

(21) Appl. No.: 16/775,376

(22) Filed: Jan. 29, 2020

(65) Prior Publication Data

US 2020/0238580 A1    Jul. 30, 2020

Related U.S. Application Data

(60) Provisional application No. 62/798,706, filed on Jan. 30, 2019.

(51) Int. Cl.
*B29C 45/00* (2006.01)
*B29C 45/26* (2006.01)
(Continued)

(52) U.S. Cl.
CPC ...... *B29C 45/0005* (2013.01); *B29C 45/0055* (2013.01); *B29C 45/261* (2013.01); *B29C 45/2681* (2013.01); *C08J 5/04* (2013.01); *C08K 5/098* (2013.01); *F04C 15/00* (2013.01); *B29C 2045/0006* (2013.01);
(Continued)

(58) Field of Classification Search
CPC ........... B29C 45/0005; B29C 45/0055; B29C 45/261; B29C 45/2681; B29C 2045/0006;
C08J 5/04; C08J 2321/00; C08K 5/098; F04C 15/00; F04C 2/1071;
(Continued)

(56) References Cited

U.S. PATENT DOCUMENTS 8,944,789 B2 *   2/2015   Butuc ................. F04C 2/1075
                                                    418/152
10,005,935 B2 *   6/2018   Fornes .................. B32B 25/18
(Continued)

FOREIGN PATENT DOCUMENTS

JP           2002113764 A   *   4/2002

OTHER PUBLICATIONS

English Machine Translation of JP2002-113764A (translated from USPTO FIT Database on Feb. 16, 2023) (Year: 2002).*

*Primary Examiner* — Dominick L Plakkoottam
*Assistant Examiner* — Paul W Thiede
(74) *Attorney, Agent, or Firm* — Zeman-Mullen & Ford, LLP (57) ABSTRACT

A stator for use in a positive displacement motor or a progressing cavity pump. The stator comprises an elastomer mix preferably including rubber and a fiber reinforcement. The fiber reinforcement includes a plurality of fibers. The elastomer mix is formed into a stator via an injection molding process. The injection molding process includes a shear flow step in which shear flow is induced in the elastomer mix while the elastomer mix is in an uncured state. The shear flow modifies the orientation of the fibers into an advantageous modified fiber orientation. Shear flow is induced preferably via differential rotation of injection mold assembly elements during the injection molding process. Methods of manufacturing the stator are also disclosed.

20 Claims, 4 Drawing Sheets

(51) Int. Cl.
*C08J 5/04* (2006.01)
*C08K 5/098* (2006.01)
*F04C 15/00* (2006.01)
*F04C 13/00* (2006.01)
*F04C 2/107* (2006.01)
*F04C 18/107* (2006.01)
*B29K 105/06* (2006.01)
*B29K 105/00* (2006.01)
*B29L 31/00* (2006.01)
*B29K 21/00* (2006.01)

(52) U.S. Cl.
CPC .............................. *B29K 2021/006* (2013.01); *B29K 2105/0038* (2013.01); *B29K 2105/06* (2013.01); *B29L 2031/749* (2013.01); *B29L 2031/7496* (2013.01); *C08J 2321/00* (2013.01); *F04C 2/1071* (2013.01); *F04C 2/1075* (2013.01); *F04C 13/008* (2013.01); *F04C 18/1075* (2013.01); *F04C 2230/20* (2013.01); *F04C 2230/60* (2013.01); *F04C 2240/10* (2013.01); *F05C 2225/02* (2013.01); *F05C 2253/04* (2013.01)

(58) Field of Classification Search
CPC ...... B29K 2021/006; B29K 2105/0038; B29K 2105/06; B29L 2031/749; B29L 2031/7496
See application file for complete search history.

(56) References Cited

U.S. PATENT DOCUMENTS

| | | |
|---|---|---|
| 10,215,176 B2 | 2/2019 | Cariveau et al. |
| 10,355,552 B2* | 7/2019 | Meng ........................ E21B 4/02 |
| 2007/0197702 A1* | 8/2007 | Nasreddine .............. C08K 5/02 |
| | | 525/387 |
| 2009/0169364 A1* | 7/2009 | Downton .............. G01L 5/0076 |
| | | 29/888.023 |
| 2015/0022051 A1 | 1/2015 | Meng et al. |
| 2017/0101990 A1* | 4/2017 | Cariveau .................. C08K 7/02 |
| 2017/0204665 A1* | 7/2017 | Meng ........................ F03C 2/08 |
| 2018/0127897 A1* | 5/2018 | Song ........................ B29B 15/10 |
| 2019/0195227 A1 | 6/2019 | Cariveau et al. |

\* cited by examiner

ELASTOMERIC STATOR WITH MODIFIED FIBER ORIENTATION

PRIORITY CLAIM

This application claims the benefit of and priority to co-pending, commonly-owned and commonly-invented U.S. Provisional Patent Application Ser. No. 62/798,706 filed Jan. 30, 2019. The entire disclosure of 62/798,706 is incorporated herein by reference as if fully set forth herein.

TECHNICAL FIELD

This disclosure is directed generally to fiber reinforced elastomeric stators including systems, methods, and techniques for modifying the orientation of reinforcing fibers within such elastomeric stators. In exemplary applications, such methods are useful in the manufacture of stators in positive displacement motors ("PDMs").

BACKGROUND

The fiber reinforcement of rubber technology described in this disclosure optimizes the properties of the rubber, and thus is useful in many industrial or commercial applications. The application of the technology to optimize the properties of rubber used in PDM stators will be used in this disclosure to illustrate one such application. This disclosure thus describes a range of optimized fiber-reinforced rubber compositions useful, for example in PDM stators, and methods of making them.

During the rubber injection process to make stators, the rubber is injected though a mold that requires the rubber to flow through a geometry with a very high length to cross section ratio. While injection molds vary, a typical stator mold includes an outer tube and an inner core. Typical stator tube geometries may have lengths of 120" to 300" for tube diameters of 4.75" and larger. Stator tubes in the 2" to 4" diameter range have typical lengths of 60" to 150" and stator tubes in the 1.5'" to 2" diameter range have typical lengths of 50" to 100". As a result of the injection flow process used to achieve these geometries, a measurable grain direction at the rubber molecular level is established in the lobes of the stator The establishment of a grain in the flow direction is unavoidable, creating undesirable anisotropy in the rubber when cured. Reinforcing fibers, pre-mixed into the injected rubber, are generally oriented along the same grain direction as a result of the injection flow as well.

Rubber anisotropy in the stator causes the material properties of the final rubber product to be different in the cylindrically transverse cross-section direction of the stator ("across the grain") than in the cylindrical longitudinal direction ("with the grain"). In fact, rubber flow during injection is more accurately in a helical pathway flowing in a generally longitudinal direction. Thus the rubber chain molecule grain and reinforcing fibers follows a helical pathway, although performance metrics of the stator look more closely in the cylindrical longitudinal direction and the cylindrical transverse cross-section.

Persons of ordinary skill in this art will understand that, consistent with applicable standards such as ASTM D412, terms such as "Young's Modulus", "Modulus of elasticity", "tensile Modulus", or just "Modulus" (as used in this disclosure) are interchangeable to describe a parameter representing the general propensity of a material to deform (elongate) under a tensile stress load. The value of Modulus for a particular material is generally measured in Pascals, and quantifies the material's propensity to deform under tensile load. The value of Modulus thus predicts an elongation in the material (or a "strain" in the material) for a given tensile stress load, Conversely, the value of Modulus predicts the tensile stress required to be applied to the material to achieve a certain elongation (or "strain"). Thus, by way of example and again consistent with ASTM D412, the term "25% tensile Modulus" or "25% Modulus" as used in this disclosure refers to the tensile stress applied to a material (or seen in a material) at 25% elongation, "50% tensile Modulus" or "50% Modulus" refers to the tensile stress applied or seen at 50% elongation, "100% tensile Modulus" or "100% Modulus" at 100% elongation, and so on.

Dynamic Modulus (also sometimes called Complex Modulus) refers to the study of Elastic Modulus in vibration conditions when the material is subjected to multiple repeating cycles of stressing and relaxation. Dynamic Modulus (or Complex Modulus) is thus of interest in elastomer (rubber) applications such as in PDM stators. Dynamic Modulus or Complex Modulus is further relevant in analysis of materials under vibratory testing conditions such as in a rubber process analyzer or dynamic mechanical analyzer.

Storage Modulus is generally understood as a material parameter related to Elastic Modulus. The Storage Modulus reflects the elasticity of a material. If a material is 100% elastic, all of the work inputted to the material would hypothetically be returned. There would be no heat loss during stress and relaxation of the material, nor would the material ever deform inelastically after stress. In some examples, Storage Modulus reflects the amount of work returned elastically by a material when stress is applied over time. In other examples, Storage Modulus reflects the ability of a material to return to its original state after stress.

Loss Modulus is generally understood as a material parameter also related to Elastic Modulus. Loss Modulus reflects the viscous behavior of a material. Loss Modulus may also be referred to as Viscous Modulus. If a material is 100% viscous (as are most liquids), all work inputted is converted to heat and/or inelastic deformation, and the material does not return to its original state. It is desirable in elastomeric materials such as rubber to minimize the Loss Modulus in order to maximize elastic performance.

Modulus is one important material performance property of rubber in PDM stators. Modulus is also a somewhat reliable indicator of other desirable material properties, in that higher Modulus will normally indicate higher tensile strength and crack resistance. Without some sort of reinforcement, the rubber anisotropy inevitably caused by injection molding in stator manufacturing causes the cured rubber to exhibit lower Modulus in the cylindrical transverse cross-section direction ("across the grain") versus in the cylindrical longitudinal direction ("with the grain"). Low Modulus in the transverse direction leads to premature breakdown and "chunking" of the rubber under cyclic operational loads in a PDM.

Fibers introduced into the rubber strengthen the rubber composite, and improve material properties such as crack resistance. When added to rubber, small amounts of fiber can significantly improve the life of components by acting to distribute stress across the component more effectively. This is particularly effective as the component weakens during cyclic loading. Fibers distribute and dissipate energy at the crack tip of any flaw initiation site, thereby slowing the crack initiation and propagation stage of fatigue failures.

Unfortunately, however, fibers within a rubber composite are susceptible to the same grain alignment during manufacture as the underlying rubber chain molecules. Thus conventional fiber-reinforced rubber composites do little to address loss in transverse Modulus, for example, due to the underlying rubber molecule chain anisotropy. The reality is that when elongate fibers are added to the rubber composition, the fibers also tend to align substantially with the grain, i.e., in the flow direction of the helical path of the lobe geometry created during the injection process. The most significant changes in material physical properties enabled by the fibers will be aligned with this helical path and substantially along the cylindrical length of the stator. In the transverse cross-sectional direction, the material properties will tend to change less. In order to enhance transverse material properties such as transverse Modulus, therefore, it becomes desirable to modify the orientation of the reinforcing fibers to more of a transverse orientation.

U.S. Pat. No. 8,944,789 to Butuc et al. ("Butuc") discloses reinforcing a rubber composite with a variety of "reinforcing agents" including fiber. Disclosed embodiments in Butuc use aramid fibers such as KEVLAR® fibers. Butuc further discloses use of magnetically-responsive particles to be included with the reinforcing agents and dispersion substances. In FIG. 4C and associated disclosure, Butuc activates a magnetic source through the longitudinal center of the stator during curing of the rubber composite, with the goal of causing the magnetically-responsive particles to align the reinforcement fibers towards the source. As a result, the fiber orientation in such stators is substantially uniformly in the radial transverse direction, orthogonal to the stator's cylindrical axis. See also FIG. 5B of this disclosure and associated text below.

Butuc's magnetic method leaves several drawbacks that do not address or remediate the fiber orientation problem in any practical way. First, there is no disclosure in Butuc regarding what effect, if any, the addition of magnetically-responsive particles may have on the material properties of the finished stator. Second, the magnetic alignment process produces radially aligned transversely-oriented fibers, as opposed to circumferentially aligned fibers with at least a partial orientation in a cylindrical longitudinal direction. Fiber orientation according to the Butuc disclosure thus significantly compromises reinforced rubber properties in both the circumferential and cylindrical longitudinal directions. Finally, there is no validation in Butuc (e.g. via disclosed experimentation or examples) that the magnetic alignment process actually produces the transversely-aligned fibers as suggested.

There is therefore also a need in the art for a technique to modify the orientation of reinforcing fibers in rubber compounds so that the reinforcing fibers are in more of a transverse orientation while still generally circumferentially aligned.

SUMMARY AND TECHNICAL ADVANTAGES

The performance of mud motor power sections can be improved significantly by the addition of reinforcing fibers. As discussed, alignment of the reinforcing fibers generally follows the flow direction of the rubber during the injection process. This effect can lead to significant reinforcement in the longitudinal direction but relatively little reinforcement in the transverse direction.

Disclosed embodiments relate to a process that may be incorporated into the injection molding process of the stator in order to beneficially modify the orientation of reinforcing fibers. Elastomer (or rubber) is pre-mixed with reinforcing fibers and pre-heated. The mix is then injected into the mold. One element of the injection mold tooling is then rotated relative to another element while the injected rubber mix is still in an uncured "green" state, thereby inducing a shear flow (and preferably, a generally transverse shear flow) in the uncured rubber. For example, the outer tube of an injection mold may be held substantially stationary while the inner core is rotated about its cylindrical or longitudinal axis. Alternatively, the inner core may be held substantially stationary while the outer tube is rotated about its cylindrical or longitudinal axis. In either arrangement, a shear flow (and preferably, a generally transverse shear flow) may be induced in the flowable rubber before it is cured.

The reinforcing fibers mixed in the uncured rubber will begin to at least partially realign with the shear flow direction, thereby modifying the orientation of the reinforcing fibers in a fully cured rubber. This modified orientation may lead to directional material properties such as higher overall stiffness (and higher Modulus) in a transverse direction to the stator's longitudinal axis, and lower overall stiffness (and lower Modulus) in a parallel direction to the stator's longitudinal axis.

It is therefore a technical advantage, in exemplary embodiments, to manufacture a fiber-reinforced elastomer rubber) PDM stator whose modified fiber orientation reduces overall rubber anisotropy. As noted herein, conventional injection-molded fiber-reinforced elastomer stators show anisotropy between properties measured "across the grain" vs. "with the grain" when the fibers are orientated generally with the injection flow direction of the elastomer. The improvements described in this disclosure modify the orientation of the fibers during the injection molding process to yield a stator whose fibers are realigned in a more transverse direction to the stator's longitudinal axis as compared to the conventionally injection-molded stator. This modified fiber orientation reduces overall anisotropy as compared to the conventionally injection-molded stator. This modified fiber orientation further increases overall stiffness (and Modulus), and overall crack resistance in the transverse direction to the stator's longitudinal axis as compared to the conventionally injection-molded stator, especially under cyclic loads.

According to a first aspect, therefore, this disclosure describes exemplary embodiments of a stator for use in a positive displacement motor or a progressing cavity pump, the stator comprising: an elastomer mix including rubber and a fiber reinforcement, the fiber reinforcement including a plurality of fibers; the elastomer mix formed into a stator via an injection molding process, the injection molding process including a shear flow step in which shear flow is induced in the elastomer mix while the elastomer mix is in an uncured state; wherein the fibers have a modified fiber orientation resulting from said shear flow step.

In embodiments according to the first aspect, the shear flow step may include differential rotation of injection mold assembly elements during said injection molding process.

In embodiments according to the first aspect, the elastomer mix may include greater than about 1.0 phr of fibers.

In embodiments according to the first aspect, the elastomer mix may include a blend of unchopped elongate fibers and chopped fibers.

In embodiments according to the first aspect, the elastomer mix may further include a trimellitate plasticizer.

According to a second aspect, this disclosure describes exemplary embodiments of a method for manufacturing a stator for use in a positive displacement motor or a progressing cavity pump, the method comprising the steps of: (a) assembling a mold assembly, wherein the mold assembly is generally cylindrical in shape with a longitudinal cylindrical axis, the mold assembly including a cylindrical outer tube element and an inner core element, the inner core element disposed within the outer tube element so as to provide a space between the inner core element and the outer tube element; (b) injecting an uncured elastomer to the space, the elastomer mix including rubber and fibers; (c) while the elastomer mix is still in an uncured state, rotating one of the inner core element and the outer tube element about the cylindrical axis relative to the other of the inner core element and the outer tube element; and (d) following step (c), curing the elastomer mix.

In embodiments according to the second aspect, the inner core element may have helical pathways formed thereon.

In embodiments according to the second aspect, in step (c), the inner core element may be rotated and the outer tube element may be substantially stationary.

In embodiments according to the second aspect, in step (c), the outer tube element may be rotated and the inner core element may be substantially stationary. In some of such embodiments, the outer tube element may be rotated in a range between about 0.1 RPM and about 5 RPM. In other of such embodiments, the outer tube element may be rotated for a time period in a range between about 10 seconds and about 30 minutes.

In embodiments according to the second aspect, step (c) may create shear flow in the elastomer mix in the space, in which the shear flow modifies orientation of the fibers within the elastomer mix in the space.

In embodiments according to the second aspect, during step (c), the elastomer mix may be maintained in the space at a temperature in a range between about 150° F. and about 260° F.

In embodiments according to the second aspect, the elastomer mix may include greater than about 1.0 phr of fibers.

In embodiments according to the second aspect, the elastomer mix may include a blend of unchopped elongate fibers and chopped fibers.

In embodiments according to the second aspect, the elastomer mix may further include a trimellitate plasticizer.

in embodiments according to the second aspect, prior to step (b), a bonding agent may be applied to an interior surface of the outer tube element.

In embodiments according to the second aspect, step (c) may includes an amount of rotation in a range between about 0.5 revolutions and about 50 revolutions.

According to a third aspect, this disclosure describes exemplary embodiments of a stator product of the stator manufacturing process comprising the steps of: (a) assembling a mold assembly, wherein the mold assembly is generally cylindrical in shape with a longitudinal cylindrical axis, the mold assembly including a cylindrical outer tube element and an inner core element, the inner core element disposed within the outer tube element so as to provide a space between the inner core element and the outer tube element; (b) injecting an uncured elastomer mix into the space, the elastomer mix including rubber and fibers; (c) while the elastomer mix is still in an uncured state, rotating one of the inner core element and the outer tube element about the cylindrical axis relative to the other of the inner core element and the outer tube element; and (d) following step (c), curing the elastomer mix.

The foregoing has rather broadly outlined some features and technical advantages of the disclosed technology, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of embodiments described in detail below, and the advantages thereof, reference is now made to the following drawings, in which:

FIGS. 6, 7 and 8 are schematic diagrams illustrating alternative exemplary injection molding protocols consistent with FIG. 2, in which:

DETAILED DESCRIPTION

The following description of embodiments provides non-limiting representative examples using Figures, diagrams, schematics, flow charts, etc. with part numbers and other notation to describe features and teachings of different aspects of the disclosed technology in more detail. The embodiments described should be recognized as capable of implementation separately, or in combination, with other embodiments from the description of the embodiments. A person of ordinary skill in the art reviewing the description of embodiments will be capable of learning and understanding the different described aspects of the technology. The description of embodiments should facilitate understanding of the technology to such an extent that other implementations, not specifically covered but within the knowledge of a person of skill in the art having read the description of embodiments, would be understood to be consistent with an application of the disclosed technology.

Reference is now made to FIGS. 1 through 8 in describing the currently preferred embodiments of the disclosed transmission. For the purposes of the following disclosure, FIGS. 1 through 8 should be viewed together or in comparative context. Any part, item, or feature that is identified by part number on one of FIGS. 1 through 8 will have the same part number when illustrated on another of FIGS. 1 through 8. It will be understood that the embodiments as illustrated and described with respect to FIGS. 1 through 8 are exemplary, and the scope of the inventive material set forth in this disclosure is not limited to such illustrated and described embodiments.

Figure 1:
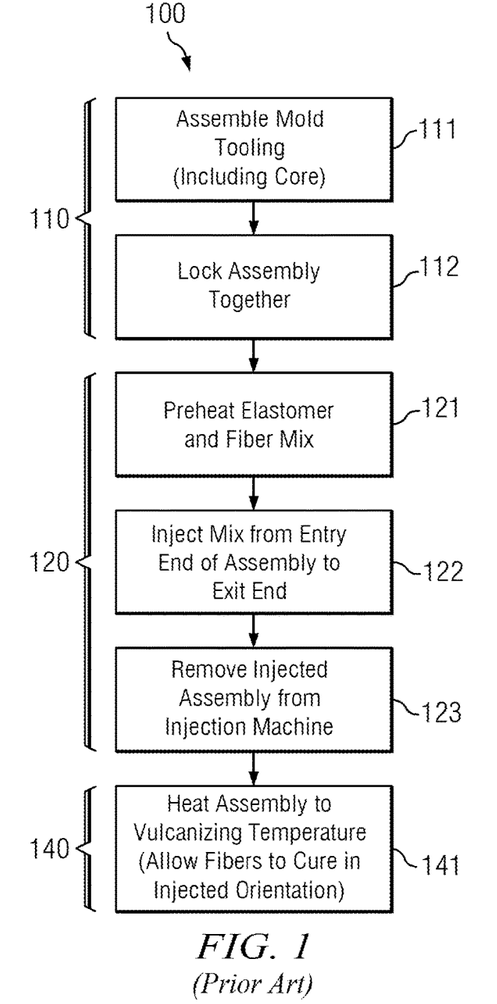
FIG. 1 is a flow chart depicting an exemplary embodiment of a conventional PDM injection molding process for an elastomer and fiber mix.

As disclosed herein, elastomer (or rubber) composites including elastomer and fiber are injection molded into a variety of different form factors and components. FIG. 1 is a flow chart depicting an exemplary embodiment of a conventional PDM injection molding process 100 for an elastomer and fiber mix. When a stator is injection molded, a mold assembly is assembled (block 111 in mold assembly phase 110). Stator mold assemblies preferably include at least an inner core element and an outer tube element with a space (or void) between for receiving the injected rubber mix. These elements (or components) are assembled together around a common central (cylindrical) axis. As illustrated on FIG. 1, the inner core and outer tube may be locked together (block 112). In Borne embodiments, the ends of the mold assembly may be capped, sealed, or otherwise closed to contain and/or control the flow rubber once it is injected.

The injection phase may begin once the mold has been assembled (see injection phase 120 on FIG. 1). The elastomer is pre-heated to a temperature which causes the rubber to become a flowable liquid (block 121). Reinforcing fibers and other additives are typically added at this time to form the rubber mix to be injected. Once the rubber mix has reached the desired viscosity, it is injected into the mold assembly (block 122). The mold assembly is then removed, as a unit, from the injection machine (block 123). The removed mold assembly unit includes outer tube and inner core, with injected mix deployed therein.

As noted above, when rubber is injected into the mold, the rubber tends to develop a grain in the direction of the flow path. Fiber reinforced rubbers establish a grain direction in substantially the same manner and any reinforcing fibers become oriented in generally the same direction as the rubber grain created by the injection flow path.

With further reference to FIG. 1, the mold assembly (including injected rubber mix) now undergoes curing phase 140. The mold assembly including injected rubber mix is heated. to a vulcanizing and/or curing temperature (block 141). This initiates a chemical reaction, thereby causing the rubber cure and solidify with the reinforcing fibers in the orientation established by the injection flow.

Figure 2:
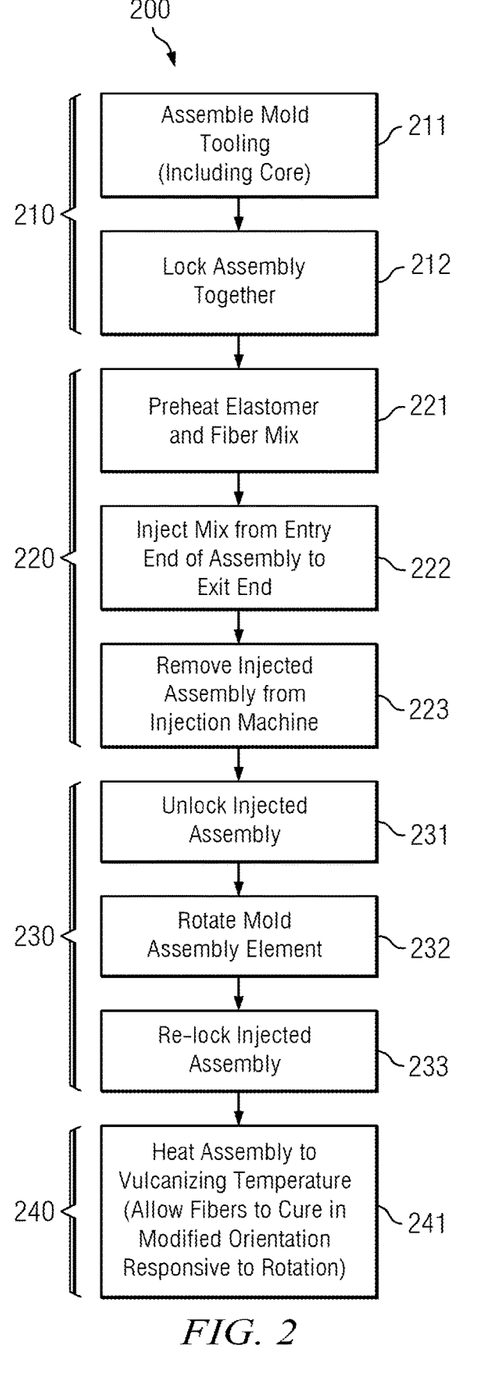
FIG. 2 is a flow chart depicting an exemplary embodiment of a PDM injection molding process, including rotation, for an elastomer and fiber mix in accordance with this disclosure.

As noted above, the technology described in this disclosure relates to the modification of the orientation of reinforcing fibers after rubber has been injected into a mold and before the rubber has been cured. FIG. 2 is a flow chart depicting an exemplary embodiment of a PDM injection molding process 200, including rotation phase 230, for an elastomer and fiber mix in accordance with this disclosure. Injection molding process 200 on FIG. 2 is substantially the same as injection molding process 100 described above with reference to FIG. 1, except with addition of rotation phase 230 on process 200 after injection phase 220 and before curing phase 240. A mold is assembled (block 211 in mold assembly phase 210). The inner core and outer tube are locked together (block 212). The elastomer is pre-heated to a temperature which causes the rubber to become a towable liquid (block 221 within injection phase 220). Reinforcing fibers and other additives are typically added at this time to form the rubber mix to be injected. Once the rubber mix has reached the desired viscosity, it is injected into the mold assembly (block 222). The mold assembly is then removed, as a unit, from the injection machine (block 223).

As shown in FIG. 2, rotation phase 230 now follows injection phase 220. Once the mold assembly is removed from the injection machine, the mold assembly may be unlocked in some embodiments (block 231) to permit rotation of a mold assembly element (block 232). A mold assembly element as described on FIG. 2 is nominally either the mold outer tube or the mold inner core. In block 232 on FIG. 2, the outer tube and/or inner core may be rotated relative to each other, such rotation about the mold assembly's cylindrical axis, thereby creating a shear flow (and preferably, a generally transverse shear flow) within the injected but uncured rubber mix deployed between outer tube and inner core. In some embodiments, the inner core may be kept substantially stationary while the outer tube is rotated. In other embodiments, the outer tube may be kept substantially stationary while the inner core is rotated. Once the desired amount of rotation has been reached, the mold assembly may be re-locked (block 233).

The curing phase 240 on injection molding process 200 on FIG. 2 is substantially similar to curing phase 140 as described above with reference to FIG. 1. The mold assembly including injected rubber mix is heated to a vulcanizing and/or curing temperature (block 241). This initiates a chemical reaction, thereby causing the rubber to cure and solidify with the reinforcing fibers in the modified orientation established first by the injection flow in injection phase 220, and then realigned in rotation phase 230.

As noted, rotating the inner core and/or outer tube of the mold assembly on FIG. 2 while the rubber is in an uncured "green' state creates a shear flow (and preferably, a generally transverse shear flow) within the rubber in the mold. The reinforcing fibers are impacted by the shear flow and will change orientation to at least partially realign with the shear flow direction. It will be appreciated that the degree to which the fiber orientation is modified may be impacted by the degree of shear flow created. The degree of fiber reorientation may also be impacted by the nature of the reinforcing fibers including, but not limited to length, diameter, aspect ratio, and/or fibrillation. In some embodiments, a blend of shorter "chopped" fibers may be used in addition to longer elongate unchopped fibers. The degree of reorientation may also be impacted by the nature of the fiber components in a blend including the proportion of the various fiber components.

Figure 3:
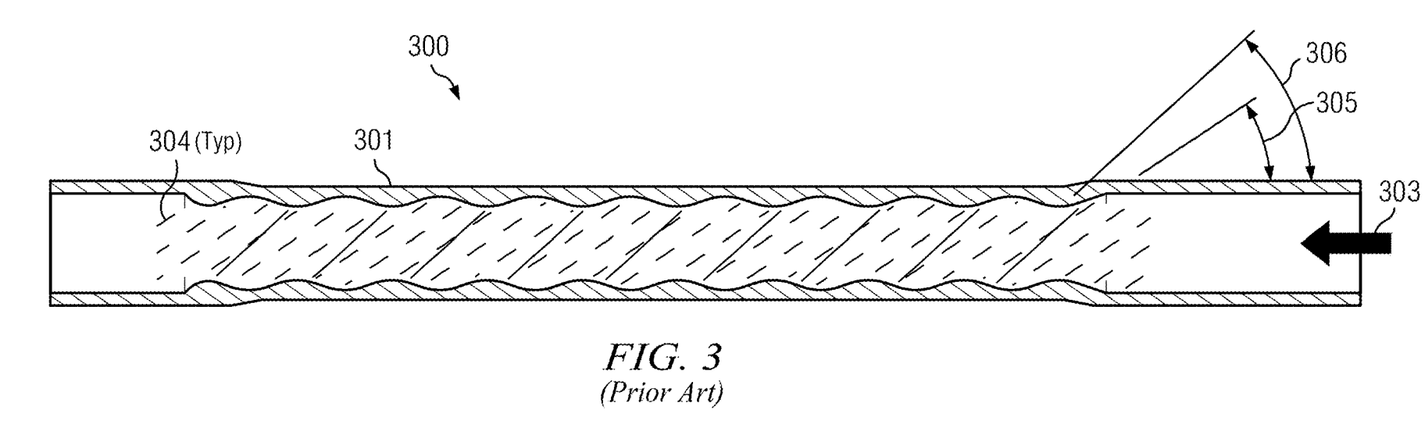
FIG. 3 is a schematic diagram depicting expected fiber orientation after conventional injection molding consistent with FIG. 1.

FIG. 3 is a schematic diagram depicting expected fiber orientation after conventional injection molding consistent with injection molding process 100 on FIG. 1. FIG. 3 illustrates the orientation of reinforcing fibers on conventional stator 300 after a rubber and fiber mix 301 is injected into a stator mold in a conventional manner (such injection represented by arrow 303). The helical nature of the inner core causes the rubber to flow in a generally helical path, denoted on FIG. 3 by helix angle 306 (as opposed to being oriented parallel to the longitudinal axis of the stator). This injected rubber flow path causes the reinforcing fibers 304 to be oriented at a bias, typically at a fiber orientation angle 305 somewhat less than helix angle 306.

Figure 4:
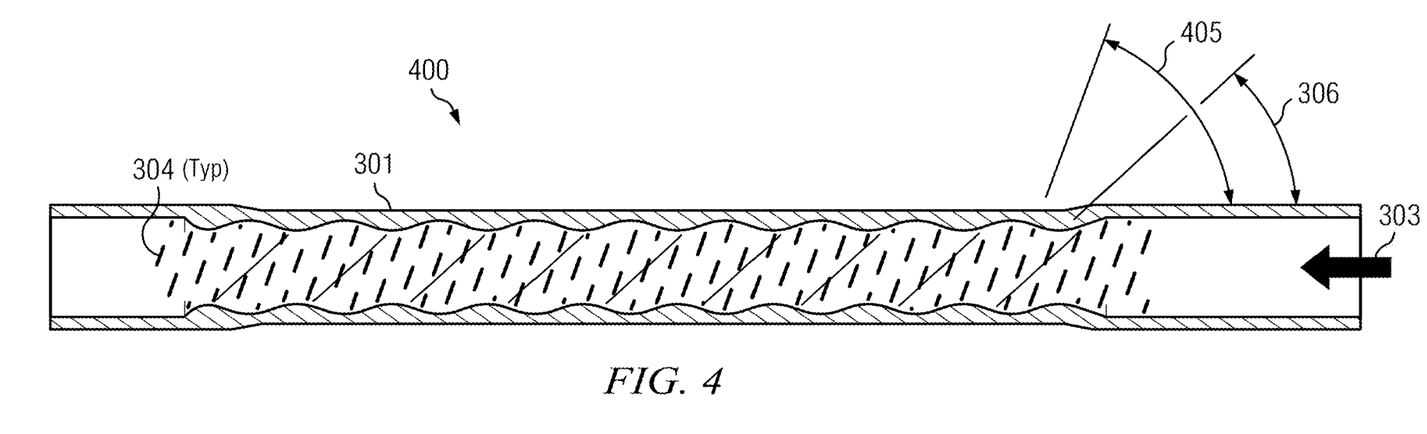
FIG. 4 is a schematic diagram depicting expected modified fiber orientation after injection molding consistent with FIG. 2.

FIG. 4 is a schematic diagram depicting expected modified fiber orientation after injection molding consistent with injection molding process 200 on FIG. 2. FIG. 4 illustrates the modified orientation of reinforcing fibers in an exemplary embodiment of the disclosed technology. Similar to FIG. 3, FIG. 4 illustrates the orientation of reinforcing fibers 304 on stator 400 after a rubber and fiber mix 301 is injected into a stator mold (such injection represented by arrow 303).

As on FIG. 3, the helical nature of the inner core causes the rubber to flow on FIG. 4 in a generally helical path, denoted on FIG. 4 by helix angle 306.

However, stator 400 on FIG. 4 has undergone fiber orientation modification consistent with rotation phase 230 on FIG. 2. Rotation of the mold assembly (as described above with reference to FIG. 2) realigns reinforcing fibers 304 responsive to a shear flow (and preferably, a generally transverse shear flow) induced into the uncured rubber mix during rotation phase 230 on FIG. 2. As seem on FIG. 4, reinforcing fibers 304 now have a fiber orientation angle 405 whose fibers are realigned in a more transverse direction to the stator's longitudinal axis as compared to fiber orientation angle 305 on the conventionally injection-molded stator on FIG. 3.

It will he appreciated that, consistent with FIGS. 2 and 4 as described above, reinforcing fibers may be oriented and/or reoriented in substantially three dimensions or any combination of these three dimensions. Further, modified fiber orientations consistent with FIGS. 2 and 4 described above are still generally circumferentially aligned.

Figure 5A:
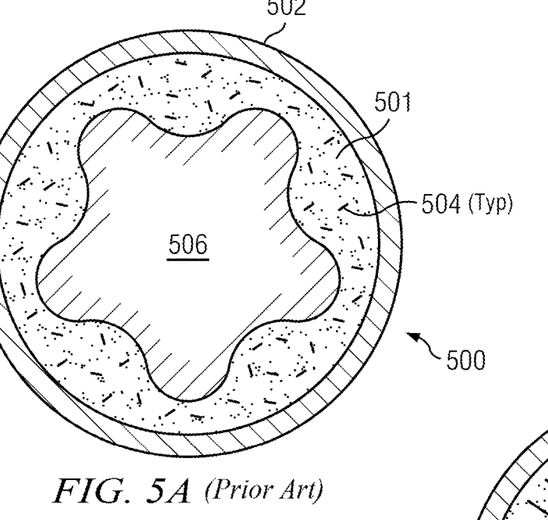
FIG. 5A is a section through an exemplary PDM stator mold assembly 500 depicting expected fiber orientation after conventional injection molding consistent with FIG. 1.
Figure 5B:
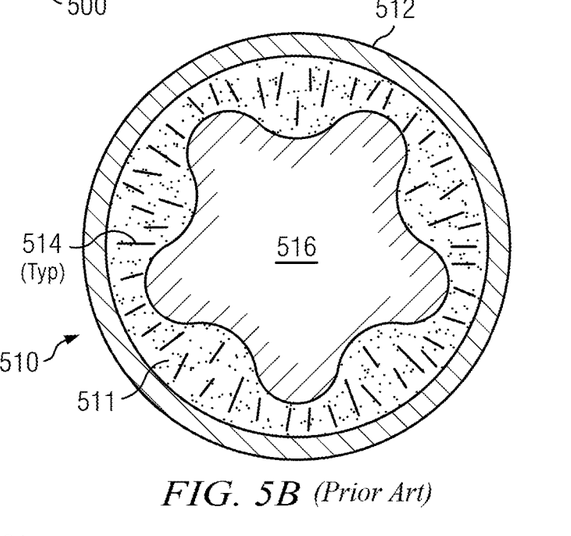
FIG. 5B is a section through an exemplary PDM stator mold assembly 510 depicting expected generally radial fiber orientation after magnetic force treatment consistent with the disclosure of U.S. Pat. No. 8,944,789 to Butuc et al. ("Butuc")
Figure 5C:
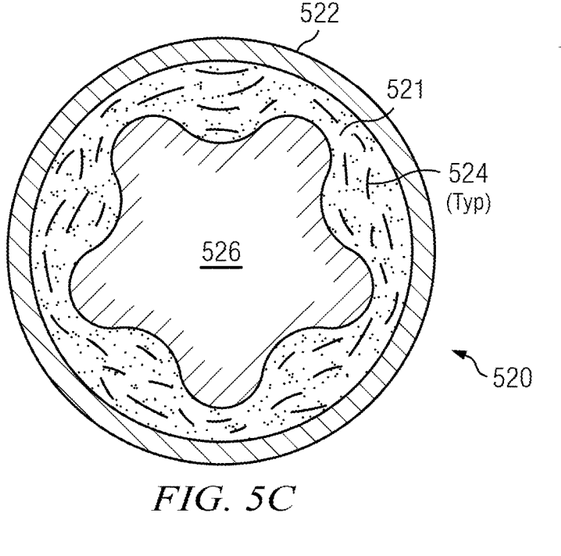
FIG. 5C is a section through an exemplary PDM stator mold assembly 520 depicting expected modified fiber orientation after injection molding consistent with FIG. 2.

FIGS. 5A, 5B and 5C are cross sections of stator mold assemblies 500, 510 and 520 respectively. FIGS. 5A and 5C are cross sections of stator mold assemblies 500 and 520 more generally described above with reference to FIGS. 1 and 2 respectively. FIG. 5A illustrates stator mold assembly 500 immediately prior to curing phase 140 on FIG. 1, depicting expected fiber orientation after conventional injection molding consistent with FIG. 1. FIG. 5C illustrates stator mold assembly 520 immediately prior to curing phase 240 on FIG. 2, depicting expected modified fiber orientation after injection molding consistent with FIG. 2.

FIG. 5B is a section through an exemplary PDM stator 510 depicting expected generally radial fiber orientation after magnetic force treatment consistent with the disclosure of U.S. Pat. No. 8,944,789 to Butuc et al. ("Butuc");

In more detail, FIG. 5A illustrates a cross section of stator mold assembly 500, in which injected elastomer and fiber mix 501 separates outer tube 502 from inner core 506. The orientation of fibers 504 shown in FIG. 5A will be understood to be generally as shown on FIG. 3, with a bias generally consistent with a fiber orientation angle expected to be somewhat less than the helix angle.

FIG. 5C illustrates a cross section of stator mold assembly 520, in which injected elastomer and fiber mix 521 separates outer tube 522 from inner core 526. In contrast to FIG. 5A, the orientation of fibers 524 on FIG. 5C will be understood to be generally as shown on FIG. 4, with a bias generally consistent with a modified fiber orientation angle, modified into a more longitudinally transverse direction as compared to the orientation angle of fibers 504 on FIG. 5A. Note that the orientation of fibers 524 on FIG. 5C is still generally circumferentially aligned. The degree to which fibers 524 on FIG. 5C are circumferentially aligned is at least partially related to the degree of shear flow induced in the uncured rubber mix during a rotation phase 230 as described above with reference to FIG. 2.

FIG. 5B illustrates a cross section of a stator mold 510, in which injected elastomer and fiber mix 511 separates outer tube 512 from inner core 516. Fibers 514 on FIG. 5B are oriented as expected after magnetic force treatment consistent with the prior art disclosure of Butuc reference (described above in the "Background" section). Butuc discloses use of magnetically-responsive particles to be included with the reinforcing agents and dispersion substances infused into the elastomer and fiber mix. In FIG. 4C and associated disclosure, Butuc activates a magnetic source through the longitudinal center of the stator during curing of the rubber composite, with the goal of causing the magnetically-responsive particles to align the reinforcement fibers towards the source. As a result, the fiber orientation in such stators is as shown on FIG. 5B, with fibers 514 oriented substantially uniformly in the radial transverse direction, orthogonal to the stator's cylindrical axis. As noted above, a drawback to this magnetic alignment process in Butuc is that the process yields radially aligned transversely-oriented fibers, as opposed to circumferentially aligned fibers with at least a partial orientation in a cylindrical longitudinal direction as described with reference to FIGS. 2 and 4 in this disclosure. Fiber orientation according to the Butuc disclosure thus significantly compromises reinforced rubber properties in both the circumferential and cylindrical longitudinal directions.

Figure 6:
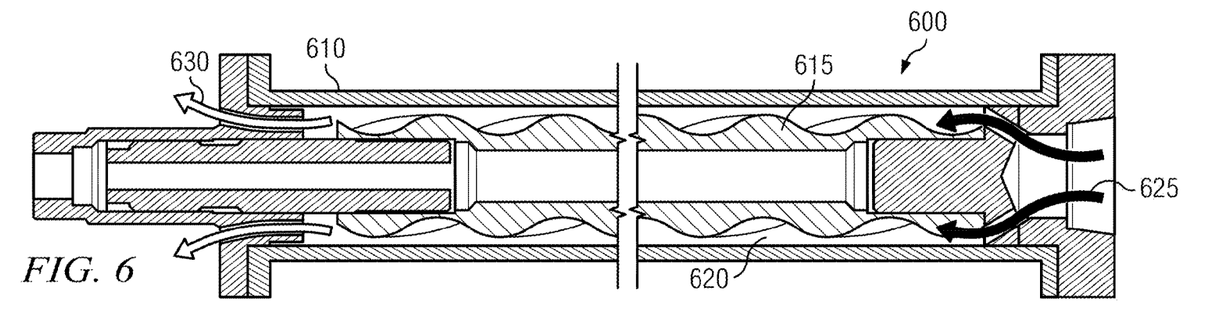
FIG. 6 illustrates single end injection.
Figure 7:
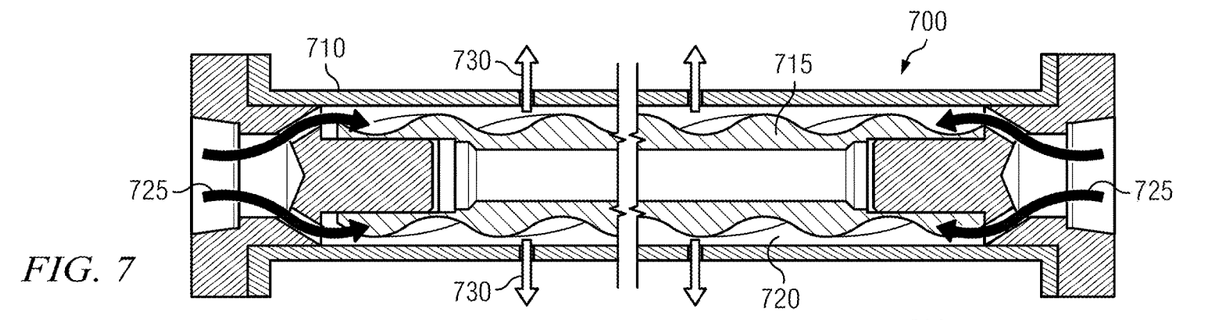
FIG. 7 illustrates dual end injection.
Figure 8:
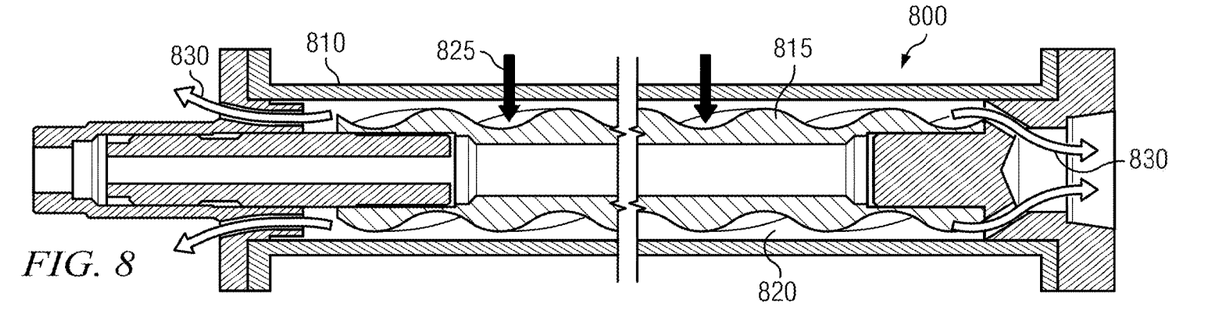
FIG. 8 illustrates multi-point injection.

FIGS. 6, 7 and 8 are schematic diagrams illustrating alternative exemplary injection molding protocols consistent with FIG. 2, in which FIG. 6 illustrates single end injection, FIG. 7 illustrates dual end injection, and FIG. 8 illustrates multi-point injection. FIGS. 6, 7 and 8 illustrate sections through mold assemblies 600, 700, and 800 respectively. Each mold assembly 600, 700, 800 includes: outer tube element 610, 710 and 810 respectively; inner core element 615, 715, 815 respectively; and space 620, 720 and 820 respectively (each space 620, 720, 820 to receive injected rubber mix). Each of FIGS. 6, 7 and 8 depict rubber mix entry with black arrows 625, 725 and 825, and rubber mix exit with white arrows 630, 730 and 830 respectively.

Stators are frequently manufactured using a single end injection molding process as shown on FIG. 6. In single end injection, liquid rubber mix is injected into one end of the mold assembly and flows through the mold assembly. Some rubber mix may be allowed to exit (bleed out) of the opposite end of the mold assembly in order to ensure the mold assembly is entirely filled. Consistent with FIGS. 1 and 3 as described above, single injection molding creates a generally consistent grain direction and fiber orientation throughout the injected rubber mix.

In some embodiments, other manufacturing considerations may make it optimal to inject liquid or flowable rubber mix from two opposing ends of a mold assembly as shown on FIG. 7. In embodiments such as illustrated on FIG. 7, the rubber mix exits (bleeds out) from one or more points in the middle of the mold assembly.

In other embodiments, yet further manufacturing considerations may make it optimal to inject liquid or towable rubber mix from one or more points in the middle of the mold assembly as shown on FIG. 8. In embodiments such as illustrated on FIG. 8, the rubber mix exits (bleeds out) from one or both ends of the mold assembly.

When multi-point injection points are used such as in injection protocol embodiments illustrated on FIGS. 7 and 8, injection flow of the rubber mix may be turbulent within the mold assembly, thereby causing regions of reinforcing fibers to be oriented in near random directions. Such random fiber orientations, even when limited to regions thereof, may not be optimal to predict rubber performance in an operational stator. In some embodiments, use of the mold assembly rotation technique described in this disclosure may be advantageous to remediate such regions of random fiber orientation. Shear flow (and preferably, generally transverse shear flow) created by mold assembly rotation, consistent with this disclosure, may realign fibers as desired (including regions of randomly-oriented fibers) into a more uniform, circumferentially-aligned fiber orientation angle.

The following disclosure describes exemplary embodiments of injection molding consistent with FIG. 2 as described above. It will be appreciated that such embodiments are exemplary only, and that the scope of this disclosure is not limited to such exemplary embodiments.

When rubber material is initially heated in order to be injected into a mold, the rubber is typically heated to a temperature of between about 100° F. to about 330° F., and preferably to a temperature between about 150° F. to about 260° F. This temperature range allows the rubber mix to reach a desirable viscosity so that the rubber becomes flowable. This viscosity allows the rubber mix to be injected into a mold assembly. This viscosity allows shear flow (and preferably a transverse shear flow), consistent with rotation phase 230 on FIG. 2, to be developed within the rubber mix by rotating one element of the mold assembly relative to another. If the rubber temperature is raised further, the curing processes may be initiated, thereby prematurely curing and/or vulcanizing the rubber mix and preventing the rubber mix from achieving the desired degree of shear flow.

It will be appreciated that different elastomer and/or rubber compositions achieve desirable viscosities at different temperatures. It will also be appreciated that different cure packages and/or curing agents may initiate the curing process at higher or lower temperatures. In some embodiments, a sulfur cure package may be used. In some embodiments, a peroxide cure package may be used. It will be appreciated that existing cure packages, with varying activation temperatures may be utilized.

The shear flow generated by rotation of the mold assembly while the rubber mix is in an uncured state may generate heat. In some embodiments, the rubber mix may be heated to a minimum flowable temperature in order to account for heat produced during rotation of the mold assembly and to reduce the likelihood that heat generated by a shear flow initiates the curing process. In some embodiments, a cure package may be selected and/or modified to avoid prematurely initiating the curing process if a higher degree of shear flow is desired. In some embodiments, the speed, acceleration, and/or duration of the disclosed rotation may be selected in order to reduce the rate of heat generation and/or amount of heat generated within the rubber mix.

As discussed, the degree to which the fiber orientation is modified is related to the amount of shear flow created within the mold assembly. The amount of shear flow created may depend at least in part on the speed, duration, acceleration and/or amount of relative rotation between the outer tube and the inner core.

The degree of shear flow is at least partially dependent on the number of relative rotations between the outer tube and the inner core. In some embodiments, the shear flow is generated by an amount of rotation of at least about 0.5 of a revolution of the outer tube relative to the inner core, or at least about 1 revolution, or at least about 3 revolutions, or at least about 5 revolutions, or at least about 10 revolutions or at least about 20 revolutions, or at least about 50 revolutions. In some embodiments, the shear flow is generated by at most about 0.5 of a revolution of the outer tube relative to the inner core, or at most about 1 revolution, or at most about 3 revolutions, or at most about 5 revolutions, or at most about 10 revolutions or at most about 20 revolutions, or at most about 50 revolutions.

In some embodiments, the outer tube may be rotated relative to the inner core for at least about 10 seconds, or at least about 30 seconds, or at least about 1 minute, or at least about 3 minutes, or at least about 5 minutes, or at least about 10 minutes, or at least about 20 minutes, or at least about 30 minutes. In some embodiments, the outer tube may be rotated relative to the inner core for at most about 10 seconds, or at most about 30 seconds, or at most about 1 minute, or at most about 3 minutes, or at most about 5 minutes, or at most about 10 minutes, or at most about 20 minutes, or at most about 30 minutes.

In some embodiments, the outer tube and/or inner core of the mold assembly are rotated using a hydraulic chain vice. in some embodiments, the outer tube may be rotated indirectly by rotating an injection head and/or other component which is rotationally fixed to the outer tube. It will be appreciated that either mold assembly component (or mold assembly element) may be kept substantially stationary and/or rotated relative to the other. In some embodiments, particularly those in which a greater speed and/or number of rotations are implemented, the ends and/or other openings in the mold assembly may be sealed in order to avoid flowing the rubber mix material out of the ends of the mold assembly. In some embodiments, the rubber mix within the mold assembly may be cured with the ends uncapped.

In some embodiments, a bonding agent may be applied to the inside the outer tube element of the mold assembly. The bonding agent is applied in an uncured "green" state and facilitates bonding between the injected rubber mix material and the metal outer tube. Currently preferred embodiments of the disclosed techniques generate a shear flow within the rubber material sufficient to modify the orientation of reinforcing fibers, but not sufficient to have a negative impact on the bonding agent. If a strong shear flow is generated, the bonding agent may be swept away from the interface between the injected rubber mix material and the inner surface of the metal outer tube. If the bonding agent is swept away from the rubber/tube interface, the beneficial effects of bonding the rubber mix to the metal outer tube will be reduced and/or eliminated. Additionally, in some embodiments, the bonding agent may dilute or contaminate the injected rubber mix material.

In some embodiments, rotating the inner core element of the mold assembly while keeping the outer tube substantially stationary may reduce the amount and/or proportion of shear flow generated at the outer regions of the injected rubber mix and thereby reducing impact of rotation on the bonding agent layer.

In some embodiments, rotating the inner core element of the mold assembly while keeping the outer tube substantially stationary may result in a greater shear flow being generated relative to the inner core. If the acceleration of the inner core relative to the uncured rubber mix is too high, the liquid rubber may cavitate in any reduced pressure areas created by the rotating lobes of the inner core. Cavitation may occur has the liquid rubber mix flows and may, under excessive rotation speeds and/or accelerations, may cause the rubber mix to detach from the profile of the inner core. Additionally, in some rubber composites, any low viscosity liquid additives may outgas under reduced pressure, thereby creating a gas bubble and/or blister defect in the cured rubber mix. Optimal speed, acceleration, and amount of rotation utilized may vary depending on the formulation of the rubber composite, nature of the reinforcing fibers, dimensions of the injection mold assembly, and/or shape of the injection mold assembly. In some embodiments, a reduced rotational RPM may be utilized in order to achieve the desired reorientation of reinforcing fibers while avoiding potential defects caused by cavitation and/or disruption of an outer bonding agent.

In some embodiments, to achieve the desired material properties, the outer tube element of the mold assembly may be rotated relative to the inner core at a speed of at least about 0.1 revolution per minute (RPM, or at least about 0.25 RPM, or at least about 0.5 RPM, or at least about 1 RPM, or at least about 2 RPM or at least about 5 RPM. In some embodiments, the outer tube element of the mold assembly may be rotated relative to the inner core at a speed of at most about 0.1 RPM, or at most about 0.25 RPM, or at most about 0.5 RPM, or at most about 1 RPM, or at most about 2 RPM, or at most about 5 RPM.

In some embodiments, optical microscope views may be analyzed to show particle and grain boundaries. In some embodiments, anisotropy may be analyzed using ASTM tensile coupons from a cross section of a stator. In some embodiments, the disclosed rotation techniques may be utilized to impact the grain and/or fiber orientation as well as the associated anisotropy within a stator or other rubber composite.

In some embodiments, although not specifically illustrated herein, rotation phase 230 on FIG. 2 may be executed during injection phase 220, rather than after injection phase 220. It will be understood that in such embodiments, shear flow (and preferably, generally transverse shear flow) caused by rotation may assist with injection of the rubber and fiber mix directly into a modified fiber orientation (modified as compared with the fiber orientation expected in a corresponding injection protocol without rotation).

Embodiments have been described in this disclosure with reference to exemplary deployments in stators for use in positive displacement motors (PDMs). It will be appreciated, however, that exemplary deployments may also include stators for use in progressing cavity pumps (PCPs).

Embodiments as described in this disclosure may provide a method of modifying fiber orientation in uncured rubber, the method comprising the steps of: (a) injecting a material comprising rubber into a mold assembly wherein the mold assembly comprises an inner core and an outer tube; (b) rotating the inner core relative to the outer tube, thereby inducing a shear flow in the material; and (c) curing the material. in some preferred embodiments, the material also comprises a plurality of reinforcing fibers. In some embodiments, the inner core may be rotated at between about 0.1 and about 1 RPM relative to the outer tube. In some embodiments, the material may be maintained at a temperature between about 150° F. and about 260° F. while the inner core is rotating relative to the outer tube. In some embodiments, the step of curing the material may comprise heating the material to a vulcanizing temperature.

Embodiments as described in this disclosure may also provide a stator for use in a positive displacement motor, the stator comprising: a rubber compound formed into a stator tube; the rubber compound including a plurality of fibers, the plurality of fibers oriented in a grain direction, wherein at least a portion of the fibers are oriented circumferentially around a central longitudinal axis of the stator. In some embodiments, the rubber compound may comprise a fiber loading of greater than 1.0 phr of fibers. In some embodiments, the rubber compound is formed into a stator tube by (1) injecting a flowable rubber into a mold assembly including an inner core and an outer tube disposed about a common longitudinal axis; (2) rotating the outer tube relative to the inner core about the common longitudinal axis; and (3) curing the rubber compound in the mold. In some embodiments, the rubber compound may be maintained at a temperature between about 150° F. and about 260° F. while the outer tube is rotating relative to the inner core. In some embodiments, the rubber compound may further include a trimellitate plasticizer. In some embodiments, the plurality of fibers includes a blend of elongate unchopped fibers and chopped fibers.

Although the inventive material in this disclosure has been described in detail along with some of its technical advantages, it will be understood that various changes, substitutions and alternations may be made to the detailed embodiments without departing from the broader spirit and scope of such inventive material, some embodiments of which are recited in the appended. claims.

I claim:

1. A method for manufacturing a stator for use in a positive displacement motor or a progressing cavity pump, the method comprising the steps of:
    (a) assembling a mold assembly, wherein the mold assembly is generally cylindrical in shape with a longitudinal cylindrical axis, the mold assembly including a cylindrical outer tube element and an inner core element, the inner core element disposed within the outer tube element so as to provide a space between the inner core element and the outer tube element;
    (b) injecting an uncured elastomer mix into the space, the elastomer mix including rubber and fibers;
    (c) following step (b), but while the elastomer mix is still in an uncured state, inducing a shear flow in the elastomer mix by rotating the outer tube element about the cylindrical axis while holding the inner core element substantially stationary, wherein the shear flow has a shear flow direction generally transverse to the cylindrical axis, such that the shear flow modifies an orientation of at least some of the fibers in the elastomer mix to at least partially realign with the shear flow direction; and
    (d) following step (c), curing the elastomer mix.

2. The method of claim 1, in which the inner core element has helical pathways formed thereon.

3. The method of claim 1, in which the outer tube element is rotated at a speed in a range between about 0.1 RPM and about 5 RPM.

4. The method of claim 1, in which, during step (c), the elastomer mix is maintained in the space at a temperature in a range between about 150° F and about 260° F.

5. The method of claim 1, in which the elastomer mix includes greater than about 1.0 phr of fibers.

6. The method of claim 1, in which the elastomer mix includes a blend of unchopped elongate fibers and chopped fibers.

7. The method of claim 1, in which the elastomer mix further includes trimellitate acting as a plasticizer.

8. The method of claim 1, in which, prior to step (b), a bonding agent is applied to an interior surface of the outer tube element.

9. The method of claim 1, in which step (c) further includes an amount of the rotation being in a range of about 0.5 revolutions to about 50 revolutions.

10. The method of claim 1, in which the outer tube element is rotated for a time period in a range between about 10 seconds and about 30 minutes.

11. A method for manufacturing a stator for use in a positive displacement motor or a progressing cavity pump, the method comprising the steps of:
    (a) assembling a mold assembly, the mold assembly including an outer tube element and an inner core element, the inner core element disposed within the outer tube element so as to provide a space between the inner core element and the outer tube element;

(b) injecting an uncured elastomer mix into the space, the elastomer mix including rubber and fibers;

(c) following step (b), but while the elastomer mix is still in an uncured state, inducing a shear flow in the elastomer mix by rotating the outer tube element while holding the inner core element substantially stationary, wherein the shear flow has a shear flow direction, such that the shear flow modifies an orientation of at least some of the fibers in the elastomer mix to at least partially realign with the shear flow direction; and (d) following step (c), curing the elastomer mix.

12. The method of claim 11, in which, during step (c), the elastomer mix is maintained in the space at a temperature in a range between about 150° F and about 260° F.

13. The method of claim 11, in which the elastomer mix includes greater than about 1.0 phr of fibers.

14. The method of claim 11, in which the elastomer mix includes a blend of unchopped elongate fibers and chopped fibers.

15. The method of claim 11, in which the outer tube element is rotated at a speed in a range between about 0.1 RPM and about 5 RPM.

16. The method of claim 11, in which step (c) further includes an amount of the rotation being in a range of about 0.5 revolutions to about 50 revolutions.

17. A method for manufacturing a stator for use in a positive displacement motor or a progressing cavity pump, the method comprising the steps of:

(a) assembling a mold assembly, the mold assembly including an outer tube element and an inner core element, the inner core element disposed within the outer tube element so as to provide a space between the inner core element and the outer tube element;

(b) injecting an uncured elastomer mix into the space, the elastomer mix including rubber and fibers such that the elastomer mix includes greater than about 1.0 phr of fibers;

(c) following step (b), but while the elastomer mix is still in an uncured state, inducing a shear flow in the elastomer mix by rotating the outer tube element while holding the inner core element substantially stationary, wherein the shear flow has a shear flow direction, such that the shear flow modifies an orientation of at least some of the fibers in the elastomer mix to at least partially realign with the shear flow direction; and (d) following step (c), curing the elastomer mix.

18. The method of claim 17, in which the elastomer mix includes a blend of unchopped elongate fibers and chopped fibers.

19. The method of claim 17, in which the outer tube element is rotated at a speed in a range between about 0.1 RPM and about 5 RPM.

20. The method of claim 17, in which step (c) further includes an amount of the rotation being in a range of about 0.5 revolutions to about 50 revolutions.

* * * * *

UNITED STATES PATENT AND TRADEMARK OFFICE
CERTIFICATE OF CORRECTION

PATENT NO. : 11,806,902 B2
APPLICATION NO. : 16/775376
DATED : November 7, 2023
INVENTOR(S) : Cariveau Page 1 of 1

It is certified that error appears in the above-identified patent and that said Letters Patent is hereby corrected as shown below:

In the Specification

Column 5, Lines 5-6, "elastomer to the space" should read: --elastomer mix into the space--.

Column 7, Line 21, "Borne" should read: --some--.

Column 7, Line 47, "rubber cure" should read: --rubber to cure--.

Column 7, Line 63, "towable" should read: --flowable--.

Column 9, Line 16, "he" should read: --be--.

Column 10, Line 48, "towable" should read: --flowable--.

Column 12, Line 9, "in some" should read: --In some--.

Column 13, Line 40, "in some" should read: --In some--.

Column 14, Line 10, "appended. claims" should read: --appended claims--.

In the Claims

Claim 1 at Column 14, Line 30, "flow direction generally transverse" should read: --flow direction transverse--.

Signed and Sealed this
Nineteenth Day of March, 2024

*Katherine Kelly Vidal*
*Director of the United States Patent and Trademark Office*